United States Patent
Clarke

(10) Patent No.: US 6,187,230 B1
(45) Date of Patent: Feb. 13, 2001

(54) METHOD FOR FORMING MOULDED ICE PRODUCTS

(75) Inventor: Joseph Clarke, Robina (AU)

(73) Assignee: Ice Occasions Pty. Ltd., Robina Queensland (AU)

( * ) Notice: Under 35 U.S.C. 154(b), the term of this patent shall be extended for 0 days.

(21) Appl. No.: 09/305,010

(22) Filed: May 4, 1999

Related U.S. Application Data

(62) Division of application No. 09/002,846, filed as application No. PCT/AU96/00424 on Jul. 8, 1996, now Pat. No. 5,900,181.

(30) Foreign Application Priority Data

Jul. 6, 1995 (AU) .................................................. PN4014

(51) Int. Cl.[7] .................................................. B29C 39/02
(52) U.S. Cl. .............................. 264/28; 264/313; 264/334
(58) Field of Search ........................... 264/28, 313, 334; 249/82, 117, 139; 475/440, DIG. 44

(56) References Cited

U.S. PATENT DOCUMENTS

| | | | |
|---|---|---|---|
| 2,218,260 | 10/1940 | Forbes | 249/139 |
| 2,966,041 | 12/1960 | Zearfoss, Jr. et al. | 62/60 |
| 3,332,658 | 7/1967 | Lemelson | 249/139 |
| 4,104,411 | 8/1978 | Pooler | 426/421 |
| 4,206,899 * | 6/1980 | Whitehead | 249/139 |
| 4,315,037 | 2/1982 | Kelly | 426/421 |
| 4,669,271 | 6/1987 | Noel | 62/60 |
| 4,739,963 | 4/1988 | Parmacek et al. | 249/61 |
| 4,807,844 | 2/1989 | Tu | 249/78 |
| 4,817,911 * | 4/1989 | Infanti | 249/82 |
| 4,971,737 | 11/1990 | Infanti | 264/28 |
| 4,974,809 | 12/1990 | Lipke et al. | 249/82 |
| 5,471,853 | 12/1995 | Shih | 62/345 |

FOREIGN PATENT DOCUMENTS

| | | |
|---|---|---|
| 17223/88 | 12/1988 | (AU) . |
| WO9011479 | 10/1990 | (WO) . |

OTHER PUBLICATIONS

Patent Abstracts of Japan, vol. 011, No. 008 (C–396), Jan. 9, 1987 & JP 61 18 7754 (Schoichi Bamba), Aug. 21, 1986.

* cited by examiner

Primary Examiner—Jan H. Silbaugh
Assistant Examiner—Edmund H. Lee
(74) Attorney, Agent, or Firm—Volpe and Koenig, P.C.

(57) ABSTRACT

A method and apparatus for moulding ice statues using a mould formed of a liquid impervious flexible material which defines a mould cavity having the shape of the statue to be formed and a pair of extending wall portions which are held in a juxtaposed attitude during the freezing process. For demoulding, the wall portions are moved apart to increase the cross-sectional size of the mould to allow it to be released from the statue formed.

8 Claims, 3 Drawing Sheets

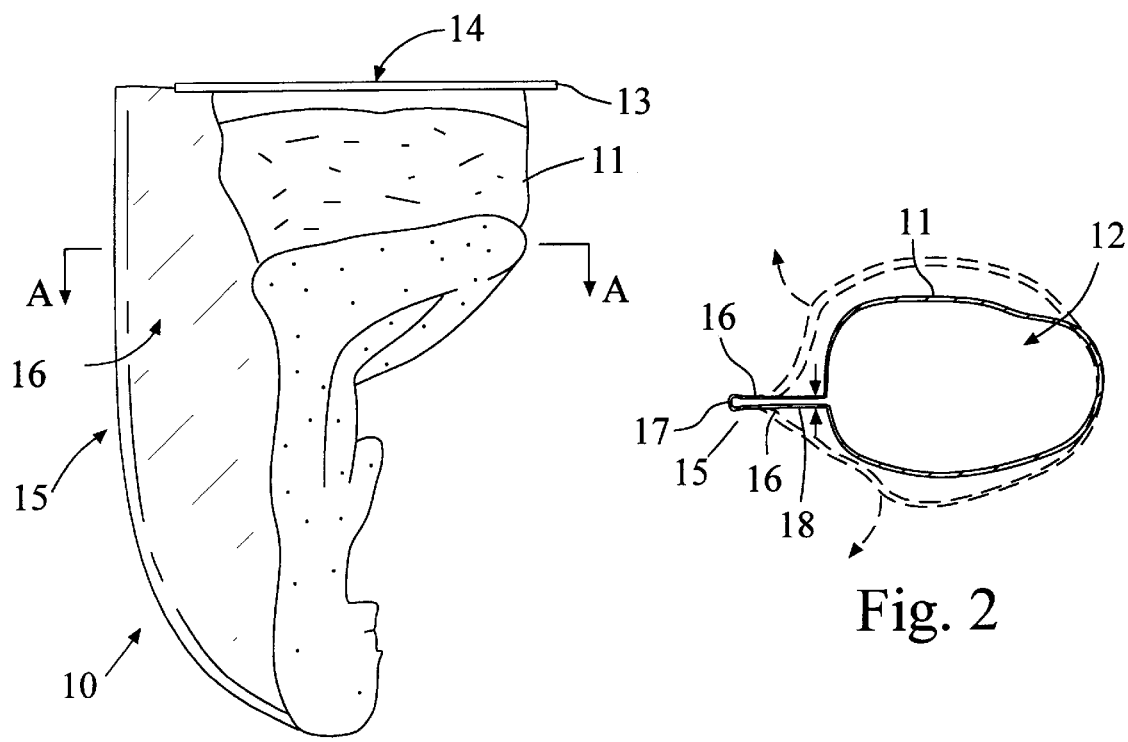
Fig. 1
Fig. 2
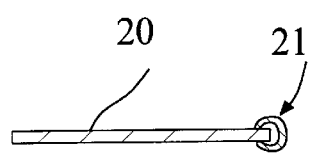
Fig. 4
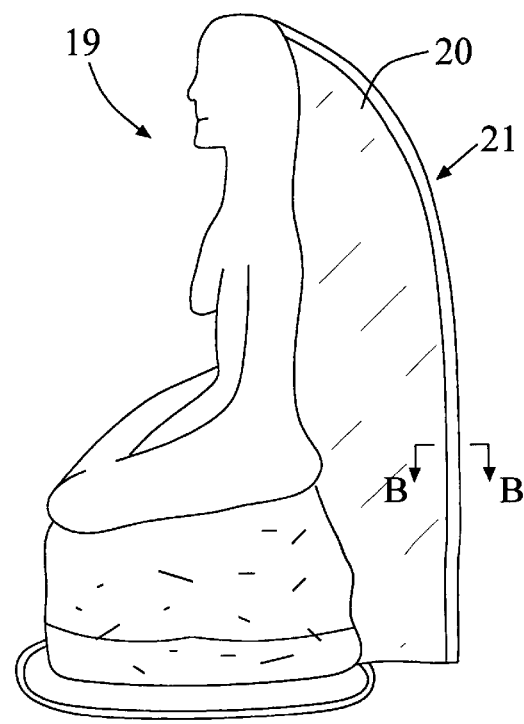
Fig. 3

METHOD FOR FORMING MOULDED ICE PRODUCTS

This Application is a divisional of U.S. patent application Ser. No. 09/002,846, now U.S. Pat. No. 5,900,181, filed on Jan. 5, 1998, which is a continuation-in-part of PCT Application No. PCT/AU96/00424 filed on Jul. 8, 1996 which claims priority from Australian Patent Application No. PN4014 filed on Jul. 6, 1995.

TECHNICAL FIELD

This invention relates to a method and apparatus for forming moulded decorative ice products, in particular moulded ice statues.

BACKGROUND ART

Ice statues have become increasingly popular for use as promotional tools or for special occasions in a number of different situations. In the past such statues have been sculpted or carved by hand from a solid piece of ice, however, this obviously is a time consuming process with high labour costs. To overcome these disadvantages, moulding methods have been used to produce ice statues which are similar in form to ice sculptures. Whilst some disadvantages are associated with moulding ice statues, generally this procedure has proved relatively effective in enabling statues to be produced. Difficulties, however, arise with the known moulding processes.

Australian Patent No. 596009 in the name of Lipke and Lipke discloses apparatus for forming ice sculptures including a mould assembly fitted with a liner formed of latex rubber for holding water to be frozen to form the sculpture. So as to prevent cracking in certain parts of the sculpture, particularly narrow portions thereof, the mould members are provided with means to vary the rate of heat transfer through the mould accomplished by either perforating parts of the outer mould member or employing insulating materials adjacent certain areas of the mould. A mould assembly of the above described type requires a number of separate parts which must be assembled prior to use. Placement of the perforated areas or insulated areas is critical to achieving a well defined moulded product. Furthermore, the time involved in producing an ice sculpture using the method and assembly disclosed in the above patent is relatively long, requiring extensive freezing and thereby resulting in increased cost of production. Further disadvantages occur because of leakage around the split mould and in demoulding without causing damage to the end product.

The present invention aims to overcome or alleviate one or more of the above disadvantages by providing improved moulding apparatus. The present invention also aims to provide a method for producing moulded products using the moulding apparatus according to the invention.

SUMMARY OF THE INVENTION

With the above and other objects in view the present invention in one preferred aspect provides an ice mould assembly including:

moulding means for moulding decorative ice products, said moulding means being formed of a thin walled flexible material and surrounding a mould cavity defining the required shape of a product to be moulded, said moulding means having an opening at one end for receiving water or freezable solution, and a wall part extended outwardly from said mould cavity at least at one position about said mould cavity to form normally juxtaposed wall portions, said portions being movable away from each other to increase the cross sectional area of said mould cavity to facilitate demoulding of a moulded product from said mould cavity or expansion of said mould cavity during moulding, and a relatively stiff support assembly having a main support supporting the open end of the moulding means and a pair of holding members which extend downwardly from the main support along respective opposite sides of the juxtaposed wall portions.

The wall portions may be joined and sealed or integrally connected at adjacent edges remote from the cavity.

Preferably the moulding means is formed of a latex rubber material or other synthetic or natural flexible liquid impervious material and the wall portions are of generally planar form and extend radially outwardly of the cavity to define a fin-like projection. If desired the moulding means may include a plurality of pairs of wall portions spaced around the mould cavity and extending outwardly therefrom to form a plurality of fin-like projections.

The present invention also provides a method of manufacturing ice statues including:

providing flexible moulding means of the above described type;

supporting the flexible moulding means by a relatively stiff support assembly which includes a main support for the upper open end of the moulding means and a pair of clamping members which extend downwardly from the main support along respective opposite sides of the juxtaposed wall portions and which maintain the wall portions together in a substantially fixed relationship during the moulding process;

arranging the supported flexible moulding means above a liquid chilling tank with its opening uppermost whereby it may be introduced into and withdrawn from the tank;

simultaneously introducing the supported flexible moulding means into the liquid chilling tank and filling the mould cavity with water or freezable solution such that the flexible moulding means is not distorted in the process;

allowing water or freezable solution within the mould cavity to freeze to form the ice statue;

withdrawing the supported flexible moulding means from the liquid chilling tank with the moulded ice statue therein, and stripping the main support from the flexible moulding means and then the flexible moulding means from the moulded statue.

Preferably the coolant in the chilling tank is circulated about the flexible moulding means during the freezing process and the clamping members of the support assembly are sufficiently stiff to maintain the flexible moulding means fixed spatially within the liquid chilling tank. For this purpose the clamping members suitably conform along one side to the shape of the adjacent portion of the moulding means. The moulding means may be secured to the support assembly by means of any suitably means such as spring clips which may urge the clamping members together but permit them to move apart during expansion of the water during freezing. The support assembly may be formed of metal or plastics materials such as glass reinforced plastics and may be integrally formed.

By substantially submerging the moulding means within the liquid, the water within the moulding means commences to freeze from the outside inwardly and according to a further aspect the water in the mould other than the that frozen adjacent the mould wall defining the mould cavity is maintained in a non-frozen state such as by being circulated, re-circulated, replaced or otherwise energised by any suitable energizing or liquefying means to ensure that freezing continues to occur progressively inwardly from the outside inwardly.

It is also preferred that during the freezing process, to ensure that the end product is substantially clear and transparent, the water within the central region of the moulding means is filtered to reduce impurities such as frazzle incorporated within the moulded product. Furthermore, water within a central region of the moulding means during moulding may be withdrawn during the moulding process to remove such impurities.

The water in the mould other than the that frozen adjacent the mould wall defining the mould cavity may be energised by being circulated. This may be achieved by removing water in a central region of the cavity and reintroducing that water to create a vortex within the cavity. The energising allows water to freeze from the outside inwardly in a controlled manner which achieves the requisite clarity in the statue.

If desired and towards the end of the freezing process, a central volume of water within the cavity may be removed by siphoning or pumping to leave a hollow core extending inwardly from the underside of the moulded product.

In use, a light source may be located adjacent the hollow core to provide a pleasing appearance of the statue to the eye due to light diffraction through the moulded product. Inserts may also be incorporated in the mould to form part of the moulded product when the moulded product is frozen.

To reduce melting of the product, additives may be introduced into the water to render the water "hard". Such additives may include calcium and magnesium. In addition, to reduce the incidence of air bubbles within the moulded product, an oxygen scavenger may be added to the water to absorb the air bubbles. A suitable oxygen scavenger comprises sodium sulphite.

BRIEF DESCRIPTION OF THE DRAWINGS

In order that the invention may be more readily understood and put into practical effect reference will now be made to the accompanying drawings which illustrate a preferred embodiment of the invention and wherein:

FIG. 1 is a side view of a typical moulding means according to the present invention;

FIG. 2 is a sectional view along line A—A of FIG. 1;

FIG. 3 is a view of a master plug prior to preparation of the moulding means of the invention;

FIG. 4 is a sectional a view along line B—B of FIG. 3;

DETAILED DESCRIPTION OF THE PREFERRED EMBODIMENTS

Figure 5:
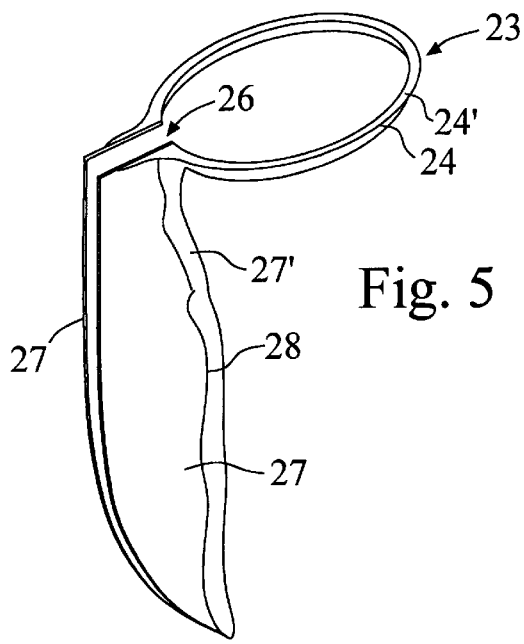
FIG. 5 is a plan view of a typical support assembly for supporting the moulding means of the invention.

Referring to the drawings and firstly to FIGS. 1 and 2 there is illustrated moulding means 10 according to the present invention which is formed of a flexible material, such as latex rubber and which includes a relatively thin wall 11 which surrounds a cavity 12 which defines the required shape of the product to be moulded. The moulding means 10 includes at its upper periphery a flexible flange 13 which surrounds an opening 14 into which material for forming the moulded product may be deposited. The side walls 11 of the moulding means 10 are shown more clearly in FIG. 2 extended outwardly at one position about the mould cavity to define a fin 15 comprising two extended side wall portions 16 which are juxtaposed and joined and sealed together at 17 at their outer edges such as by being integrally formed or joined at those edges. The side wall portions 16 define therebetween a narrow space 10 open to the cavity 12, however, the moulding means 10 is sealed by virtue of the join 17 so that moulding material can not escape therefrom.

In use the moulding means 10 is supported in the inverted attitude shown in FIG. 1 and the side wall portions 16 are held in substantially sealed engagement with each other by means of suitable clamp means adjacent the bounderies of the cavity as indicated by the arrows in FIG. 2. A settable material is then deposited via the opening 15 into the moulding means 10 which may be supported in any suitable fashion and the material is allowed to set. When demoulding is required the clamping means for the side wall portions 16 are released so that the wall portions 16 may be moved apart as indicated by the dotted arrows and the cavity 12 expanded laterally as shown in dotted outline in FIG. 2. Thereafter the expanded moulding means 10 may be simply stripped from the moulded product because of the degree of freedom and increased cross-sectional area provided by the expanded cavity 12 which may be passed freely about any protrusions and released from undercut portions of the product.

Referring now to FIG. 3 there is illustrated a plug 19 formed, for example of fibreglass or any other material, and defining a typical shape of product to be moulded. For this purpose a sculpture may be formed in a conventional manner from clay and thereafter a fibreglass shell created in a conventional method to define the master plug 19 for forming the moulding means 10. A membrane 20 formed of plastics or other relatively stiff and thin material is then applied to the plug 19 at least along one side and preferably the least detailed side to extend outwardly therefrom and the free edge of the membrane 20 terminated with a protector strip 21 which as shown more clearly in FIG. 4, may simply comprise a longitudinally slit tube which is located over the edge of the membrane 20. A latex rubber or other mould forming material is then sprayed or applied onto the plug 19, the membrane 20 and about the tube 21 to the required thickness to form the moulding means 10 with the integrally formed side wall portions 16 as described above. The formed moulding means 10 may then be stripped from the plug 19 ready for use.

Figure 6:
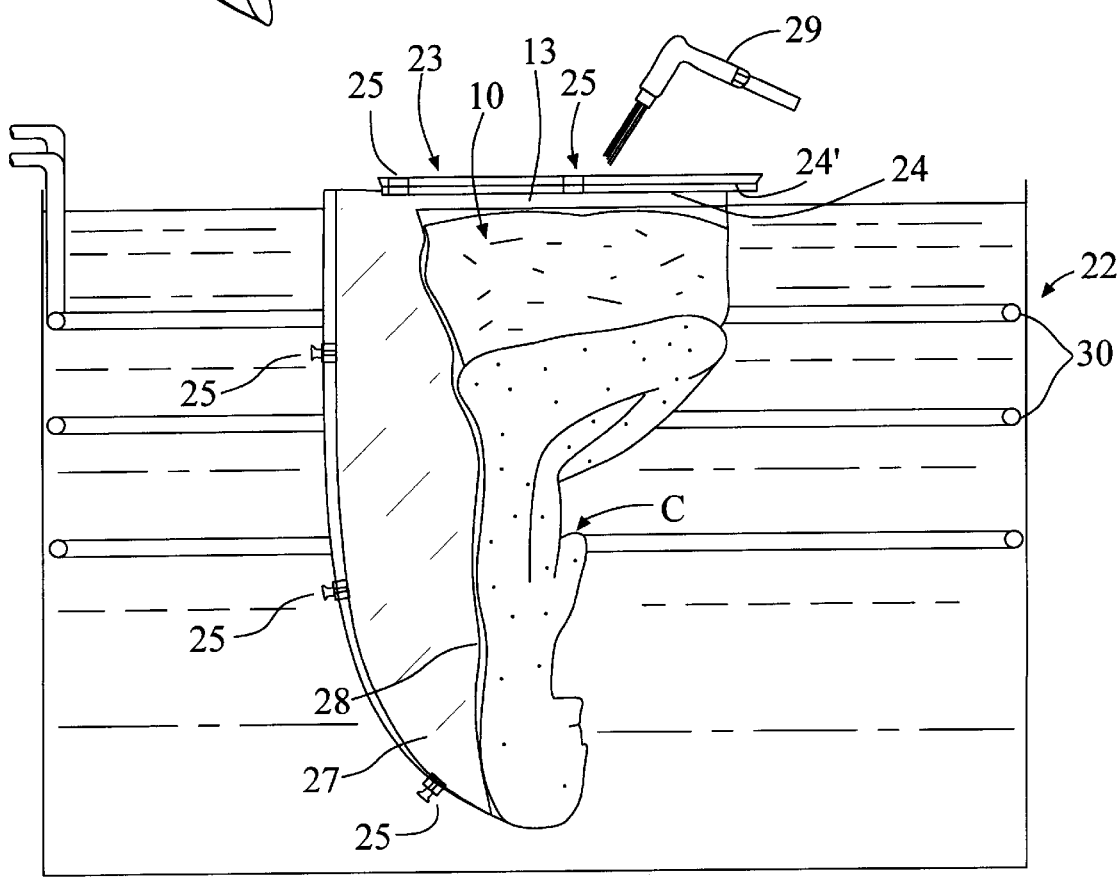
FIG. 6 is a sectional elevational view of the chilling container showing the moulding means of the invention supported therein.

The moulding means 10 of the present invention is particularly suited to the manufacture of moulded ice statues. For this purpose the moulding means 10 is used in conjunction with a tank 22 of low freezing temperature liquid, such as brine or glycol (see FIG. 6). Arranged to be supported over the tank 22 is a support frame assembly 23 adapted for supporting the moulding means 10 in an inverted attitude (see FIG. 5). The frame assembly 23 includes a supporting ring 24 over which the flange 13 of the moulding means 10 may be wrapped or located and held in position such as by spring or other clips 25 at spaced positions. Alternatively, the ring 24 may be provided with an annular flange 24' which matches the flange 13 of moulding means 10, the respective flanges 13 and 24' being held in juxtaposed attitude in use. The ring 24 is split as at 26 and a pair of planar clamping members 27 are fixed to the ring 24 on opposite sides of the split 26 or formed integrally with the ring 24 and extend substantially parallel to each other away from the ring 24, the members 27 having a shape along one edge 20 which substantially conforms to the shape of the adjacent portion of the moulding means 10. Alternatively, or additionally, the members 27 have flanges 27' which conform to the shape of the adjacent portion of the moulding means 10.

In use the moulding means 10 is located with the ring 24 with the fin 15 located between the clamping members 27 and the flange 13 wrapped over the ring 24 or supported on the flange 24' being secured thereto by spring clips 25. Further spring clips 25 are provided for urging the members 27 together and holding the wall portions 16 of the fin 15 together so that the respective side wall portions 16 of the fin 15 are pressed into firm engagement with each other.

Figure 8:
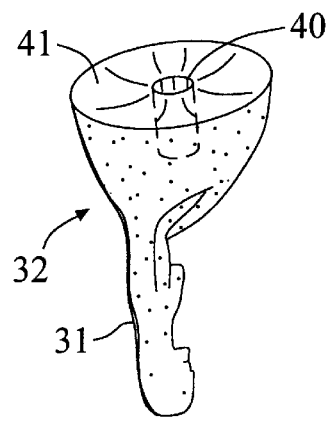
FIG. 8 illustrates from the underside a typical statue formed in accordance with the invention using the moulding means of FIG. 1.

The assembly is then lowered into the tank 22 and the cavity 12 may be filled with water say through a hose 29. The tank 22 is provided with refrigeration coils 30 connected to a refrigeration plant located externally of the tank, the coils 30 suitably being provided about the walls of the tank for chilling the liquid therein. When the moulding means 10 is lowered into the tank 22, the water within the cavity 12 will freeze from the outside inwardly due to the chilling effect of the liquid within the tank 22. Expansion of the water during the moulding process will be permitted by the wall portions 16 of the fin 15 and the spring clips 25 which hold the wall portions 16 together permit limited expanding movement thereof which will result in a thin frozen strip 31 being formed along the moulded statue 32 as shown in FIG. 8. This strip 31 however can be easily broken free of the statue 32 after removal from the moulding means 10 with the aid of a sharp tool such as a chisel.

Figure 7:
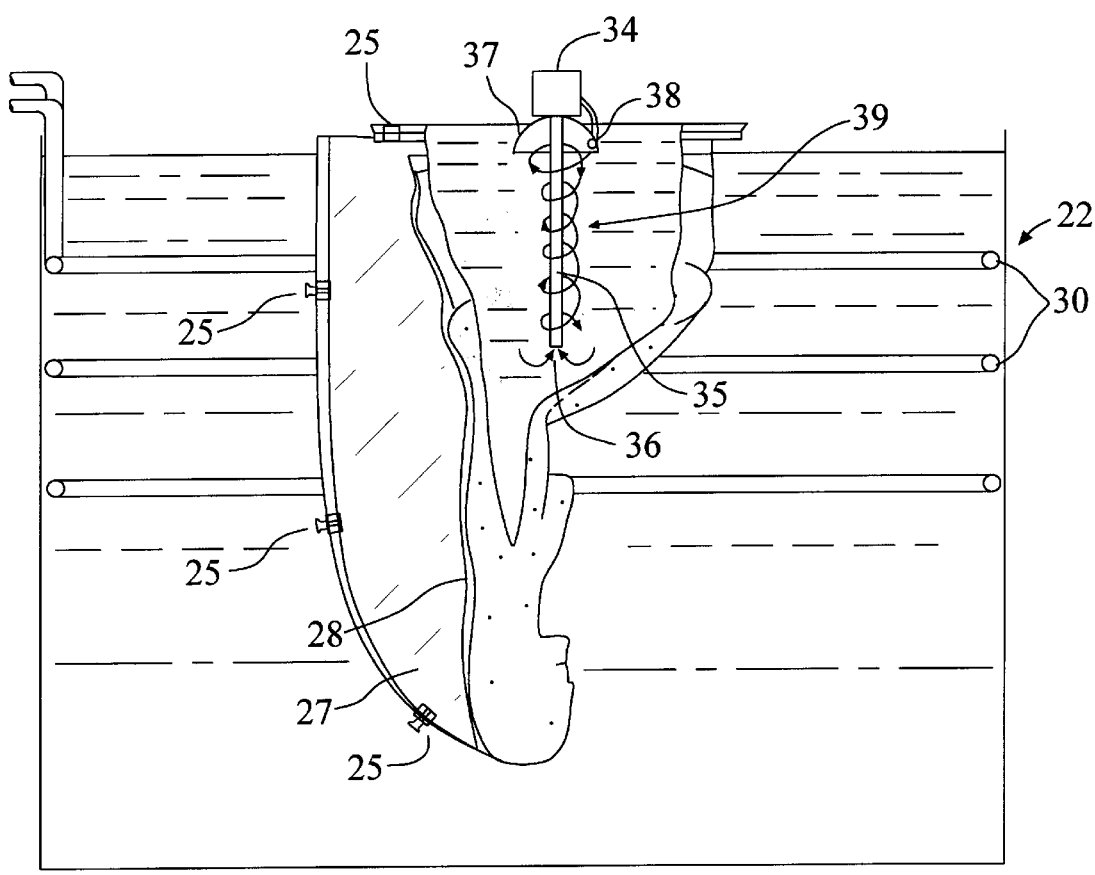
FIG. 7 is a cut-away view of the moulding means showing the water circulating arrangement.

During the moulding process, water within a central portion of the moulding means 10 is circulated, preferably in a vortex-like manner to control the rate of freezing of the water. For this purpose, a pump 34 is provided having an intake pipe 35 which extends centrally into the moulding means 10 and which has an inlet 36 at its lower end (see FIG. 7). An inverted hollow cup-shaped body 37 may be supported at the upper level of the moulding means 10 but submerged or at least partially submerged in the water within the moulding means 10. The pump 34 includes a water outlet 38 located within the cup-shaped member 37 but adjacent an outer wall thereof. The outlet 38 is directed substantially tangentially of the wall of the cup shaped member 37.

In use, when the pump 34 is operated, water is drawn in through the pipe 35 from the inlet 36 and pumped out through the outlet 38. Water exiting through the outlet 38 is caused by the body 37 to undergo a circulating vortex-like action as indicated at 39 in the centre of the moulding means 10. This ensured that the water within the moulding means 10 is stirred as it freezes, such that freezing towards the centre occurs gradually. The pump 34 and its intake pipe 35 are removed during the freezing process to prevent the pipe 35 being frozen into the moulded product. Alternatively, a central region of the moulding means 10 may be left free of water to produce a hollow section 40 in the moulded statue 32 as shown in FIG. 8.

To achieve a product which will be resistant to melting, calcium and magnesium may be added to the water, such that the water becomes "hard". In addition, to reduce the incidence of air bubbles, caused through the water circulation process, as described above, an oxygen scavenger is added to the water. The oxygen scavenger, most suitably comprises sodium sulphite.

After a suitable freezing time, the support frame assembly 23 is lifted from the tank 22 so as to also remove the moulding means 10 from the chilling liquid. The clips 25 may then be removed to release the moulding means 10 which may then be removed from the formed statue 32. For this purpose, the wall portions 16 may be moved apart to expand the cavity 12 in the manner shown in FIG. 2 so as to increase its cross sectional area and permit it to be easily removed from the statue 32. This is particularly important in undercut areas, for example the area indicated at C in FIG. 6 as expansion of the cavity 12 permits the wall 11 of the mould to be moved sideways outwardly of and clear of the undercut portion C without damage to the formed statue 32.

Use of the tank 22 containing the chilling liquid rapidly increases efficiency of freezing because the water within the moulding means 10 is indirectly in contact, so as to be in good heat transfer relationship, with the liquid within the tank 22. The time for freezing of the statues varies in accordance with the concentration of the low temperature freezing point liquid within the tank 22, the type of water used within the moulding means 10 and the size of the moulding means 10. A plurality of moulding means 10 may be supported in the tank 22 by means of separate support frame assemblies 23.

It will be apparent that the moulding means 10 may be of any form to suit the shape of the product to be formed and as stated above the moulding means 10 may include one or more fins 15. The method and apparatus of the invention is particularly suited to forming moulded hollow objects such as hollow bowls as freezing from the outside in will form the side walls of the bowl and water in the central region of such a mould may be removed during the time the mould is within the tank 22 or after its removal from the tank 22 to leave a hollow interior region.

In the embodiment shown in FIG. 8, the underside 41 of the statue 32 is of concave form leading into the hollow section 40. This will accommodate a light source so that light diffracts through the statue to provide a pleasing appearance.

A further advantage which may be achieved with the invention is that as the water freezes it expands upwardly towards the open upper end 14 of the mould and beyond the level of liquid within the tank 22. This will form a top surface which is not frozen but which spreads to form a level base. This water, being out of contact with the solution in the tank 22 will not have frozen when the ice statue is ready for removal so that a level base is formed in the statue below the top level of water in the moulding means 10.

The liquid used in the tank 22 is suitably a low freezing point liquid with a brine solution being particularly suitable. Other liquid compositions, however, may be used for this purpose. The spring clips 25 for use in the invention may be readily available fold back clips however other fasteners or other resilient holding means may be used for this purpose.

Whilst the above has been given by way of illustrative embodiment of the invention, all such modifications and variations thereto as would be apparent to persons skilled in the art are deemed to fall within the broad scope and ambit of the invention as herein defined in the appended claims.

What is claimed is:

1. A method of manufacturing decorative ice products including:

providing moulding means for moulding decorative ice products, said moulding means being formed of a thin walled flexible material and surrounding a mould cavity defining the required shape of a product to be moulded, said moulding means having an opening at one end for receiving water or freezable solution, and a wall part extended outwardly from said mould cavity at least at one position about said mould cavity to form juxtaposed wall portions, said portions being movable away from each other to increase the cross-sectional area of said mould cavity to facilitate demoulding of a moulded product from said mould cavity or expansion of said mould cavity during moulding;

supporting the flexible moulding means by a relatively stiff support assembly which includes a main support for the upper open end of the moulding means and a pair of clamping members which extend downwardly from the main support along respective opposite sides of the juxtaposed wall portions and which maintain the wall portions together in a substantially fixed relationship during the moulding process;

arranging the supported flexible moulding means above a liquid chilling tank with its opening uppermost whereby it may be introduced into and withdrawn from the tank;

simultaneously introducing the supported flexible moulding means into the liquid chilling tank and filling the mould cavity with water or freezable solution such that the flexible moulding means is not distorted in the process;

allowing water or freezable solution within the mould cavity to freeze to form the ice statue;

withdrawing the supported flexible moulding means from the liquid chilling tank with the moulded ice statue therein, and stripping the main support from the flexible moulding means and then the flexible moulding means from the moulded statue.

2. A method according to claim 1 wherein said water within the moulding means in a central region of said cavity is circulated during freezing thereof.

3. A method according to claim 1 wherein said water is circulated by removing water in a central region of said cavity and reintroducing water to create a vortex within said cavity.

4. A method according to claim 1 wherein said water is circulated by removing water in a central region of said cavity and reintroducing water to create a vortex within said cavity, said removed water is filtered prior to reintroduction into said cavity.

5. A method according to claim 1 wherein said water is circulated by removing water in a central region of said cavity and reintroducing water to create a vortex within said cavity, said removed water is replaced with further filtered water.

6. A method according to claim 1 wherein towards the end of the freezing process, a central volume of water within the cavity is removed to define a hollow core within the decorative product extending inwardly from the underside of the product.

7. A method according to claim 1 and including the step of introducing additives into said water selected from calcium and magnesium.

8. A method according to claim 1 and including the step of introducing an oxygen scavenger to said water to absorb air bubbles within said water.

* * * * *